US010951745B1

(12) United States Patent
Pan et al.

(10) Patent No.: US 10,951,745 B1
(45) Date of Patent: Mar. 16, 2021

(54) METHOD AND APPARATUS FOR HEADER COMPRESSION CONFIGURATION FOR SIDELINK RADIO BEARER IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/993,644

(22) Filed: Aug. 14, 2020

Related U.S. Application Data

(60) Provisional application No. 62/890,582, filed on Aug. 23, 2019.

(51) Int. Cl.
| | | |
|---|---|---|
| *H04L 29/06* | (2006.01) | |
| *H04W 76/10* | (2018.01) | |
| *H04W 28/02* | (2009.01) | |
| *H04L 12/24* | (2006.01) | |
| *H04W 4/40* | (2018.01) | |
| *H04W 80/02* | (2009.01) | |

(52) U.S. Cl.
CPC .......... *H04L 69/22* (2013.01); *H04L 41/0806* (2013.01); *H04W 4/40* (2018.02); *H04W 28/0252* (2013.01); *H04W 76/10* (2018.02); *H04W 80/02* (2013.01)

(58) Field of Classification Search
CPC ....................................................... H04L 69/22
See application file for complete search history.

(56) References Cited

U.S. PATENT DOCUMENTS

| | | | | |
|---|---|---|---|---|
| 2018/0242115 A1* | 8/2018 | Kim | ........................ | H04W 4/40 |
| 2018/0324631 A1* | 11/2018 | Jheng | ................ | H04W 36/0022 |
| 2019/0090107 A1* | 3/2019 | Kim | ...................... | H04W 80/08 |
| 2019/0110175 A1* | 4/2019 | Chun | ...................... | H04W 4/40 |
| 2019/0124572 A1* | 4/2019 | Park | .................. | H04W 72/0446 |

(Continued)

OTHER PUBLICATIONS

Ericsson, "Consideration on NR V2X sidelink PDCP protocol stack", 3GPP TSG-RAN WG2 #104 TDoc R2-1817959 Spokane, WA, USA, Nov. 12-16, 2018.

(Continued)

*Primary Examiner* — Raj Jain
*Assistant Examiner* — Andrew C Lee
(74) *Attorney, Agent, or Firm* — Blue Capital Law Firm, P.C.

(57) ABSTRACT

A method and apparatus are disclosed from the perspective of a UE (User Equipment) for applying header compression and decompression on a Sidelink Radio Bearer (SLRB). In one embodiment, the method includes the UE obtaining at least one Packet Data Convergence Protocol (PDCP) parameter for the SLRB from a network node. The method also includes determining whether the header compression and decompression is used for transmitting (Vehicle-to-Everything) V2X messages on the SLRB according to whether (Internet Protocol) IP based or non-IP based V2X messages are to be transmitted on the SLRB, wherein the header compression and decompression is used if IP based V2X messages are to be transmitted on the SLRB, and the header compression and decompression is not used if non-IP based V2X messages are to be transmitted on the SLRB.

10 Claims, 14 Drawing Sheets

(56) References Cited

U.S. PATENT DOCUMENTS

2019/0215729 A1\* 7/2019 Oyman ................... H04L 65/80
2020/0100088 A1\* 3/2020 Kim ....................... H04W 88/04
2020/0259896 A1\* 8/2020 Sachs ...................... H04W 4/30

OTHER PUBLICATIONS

Oppo, Ericsson, Qualcomm, ASUSTeK, LG Electronics, "Correction on PDCP for eV2X", 3GPP TSG-RAN2 Meeting #104 R2-1816352, Spokane, US, Nov. 12, 2018-Nov. 16, 2018.

\* cited by examiner

Legend:

- PC5-U: The SDAP/PDCP/RLC/MAC/PHY functionality is specified in TS 38.300 [11].
- For PDCP SDU type "Non-IP", a "Non-IP Type" header included in the SDU by upper layer to indicate the type of non-IP messages carried will be specified in stage 3 specification.

| Profile Identifier | Usage | Reference |
|---|---|---|
| 0x0000 | No compression | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

US 10,951,745 B1

METHOD AND APPARATUS FOR HEADER COMPRESSION CONFIGURATION FOR SIDELINK RADIO BEARER IN A WIRELESS COMMUNICATION SYSTEM

CROSS-REFERENCE TO RELATED APPLICATIONS

The present application claims the benefit of U.S. Provisional Patent Application Ser. No. 62/890,852 filed on Aug. 23, 2019, the entire disclosure of which is incorporated herein in its entirety by reference.

FIELD

This disclosure generally relates to wireless communication networks, and more particularly, to a method and apparatus for header compression configuration for sidelink radio bearer in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) for applying header compression and decompression on a Sidelink Radio Bearer (SLRB). In one embodiment, the method includes the UE obtaining at least one Packet Data Convergence Protocol (PDCP) parameter for the SLRB from a network node. The method also includes determining whether the header compression and decompression is used for transmitting (Vehicle-to-Everything) V2X messages on the SLRB according to whether (Internet Protocol) IP based or non-IP based V2X messages are to be transmitted on the SLRB, wherein the header compression and decompression is used if IP based V2X messages are to be transmitted on the SLRB, and the header compression and decompression is not used if non-IP based V2X messages are to be transmitted on the SLRB.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 23.287 V1.1.0, "Architecture enhancements for 5G System (5GS) to support Vehicle-to-Everything (V2X) services (Release 16)"; TR 38.885 V16.0.0, "NR; Study on NR Vehicle-to-Everything (V2X) (Release 16)"; TS 36.331 V15.3.0, "E-UTRA; Radio Resource Control (RRC) Protocol specification (Release 15)"; and TS 36.323 V15.3.0, "E-UTRA; Packet Data Convergence Protocol (PDCP) specification (Release 15)". The standards and documents listed above are hereby expressly incorporated by reference in their entirety.

Figure 1:
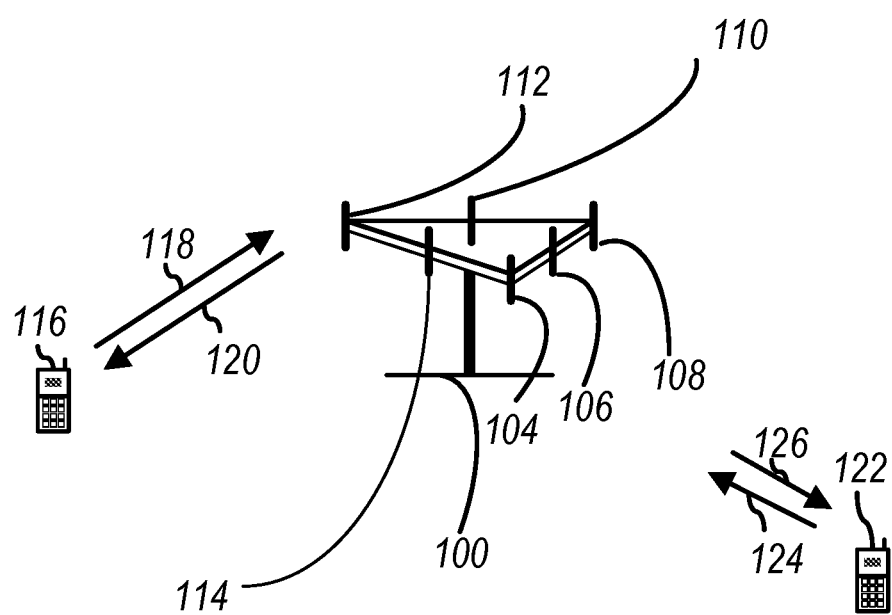
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
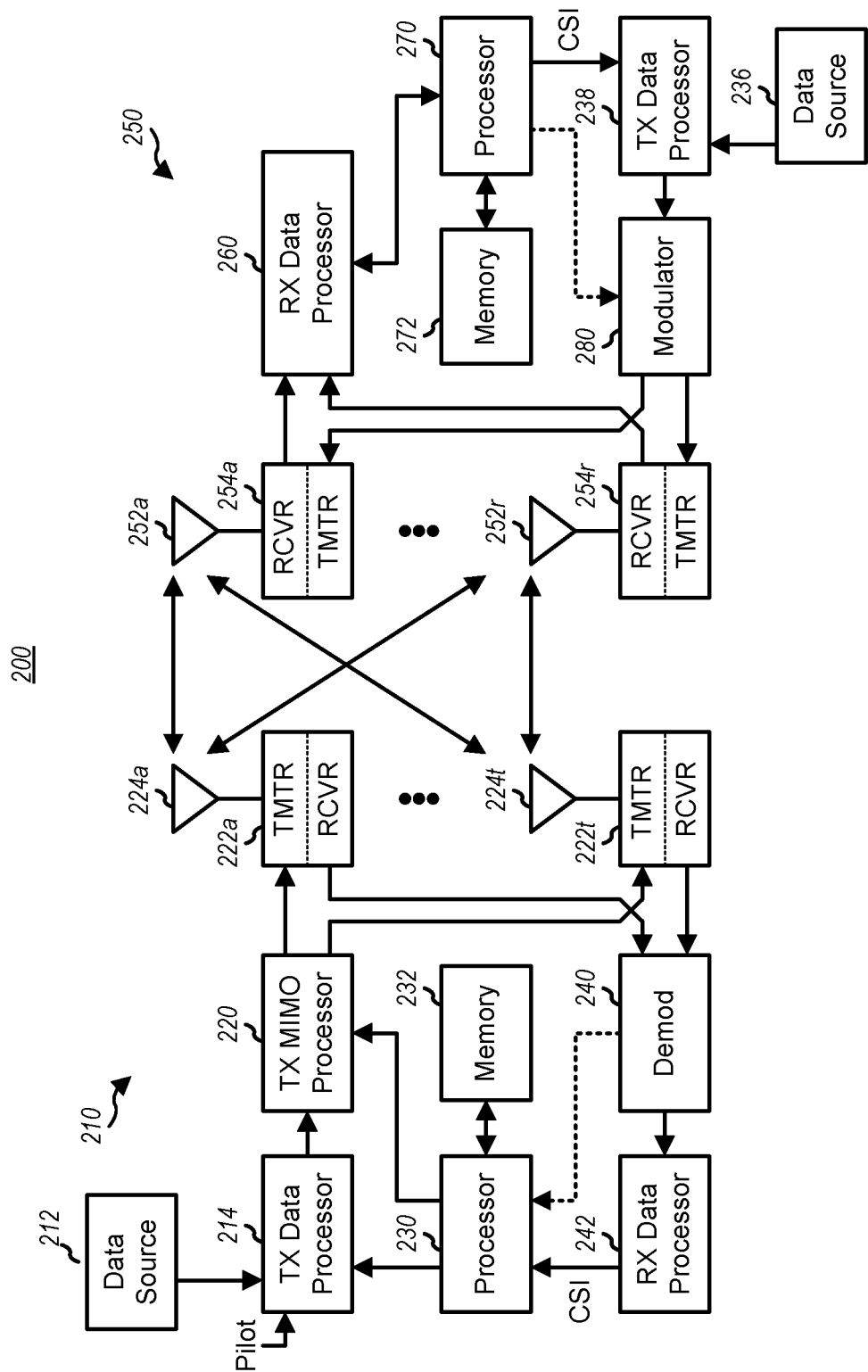
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
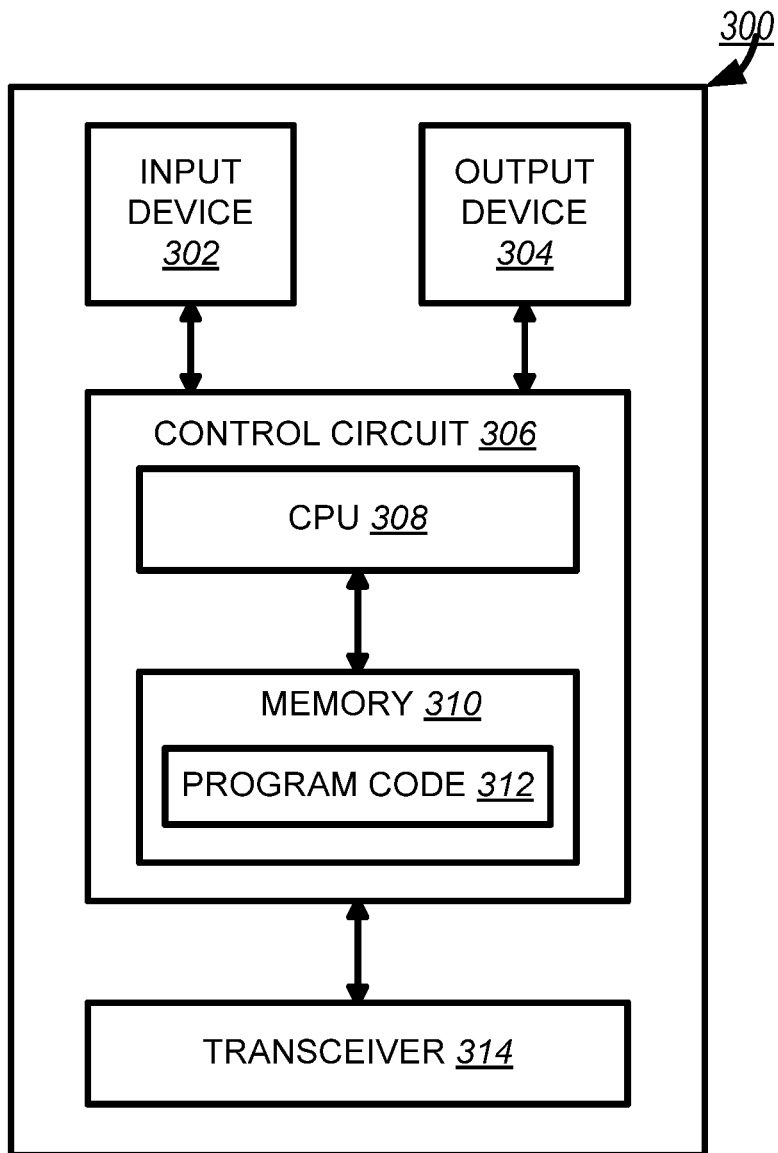
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
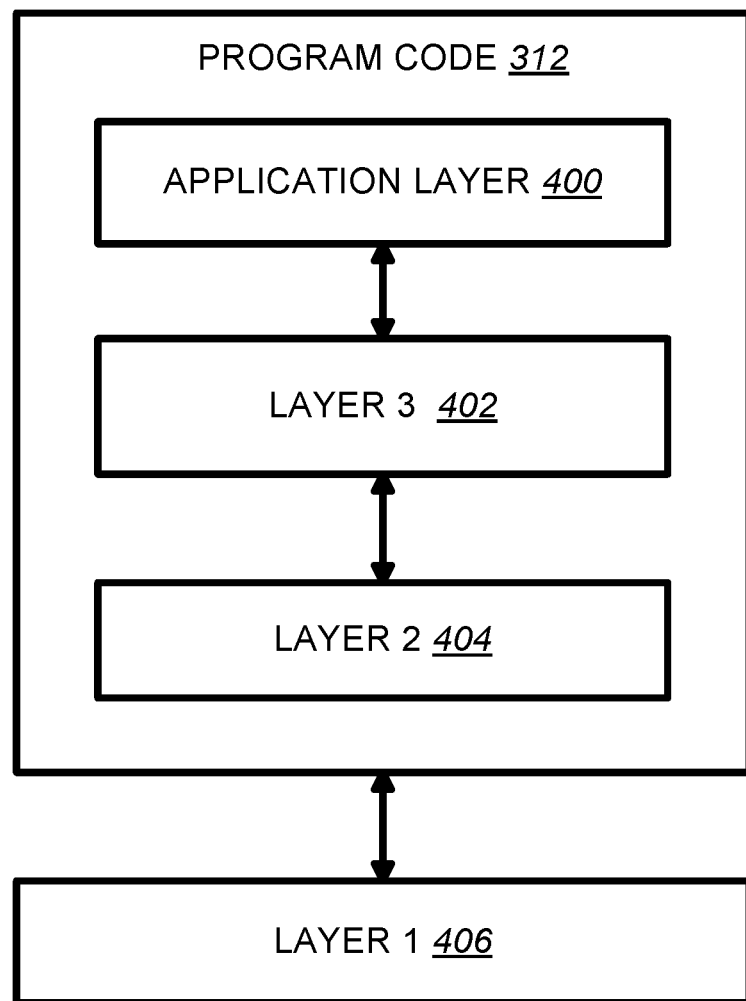
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies V2X communication as well as Authorization and Provisioning for V2X communications as follows:

5.1 Authorization and Provisioning for V2X Communications 5.1.1 General

In 5GS, the parameters for V2X communications over PC5 and Uu reference points may be made available to the UE in following ways:

pre-configured in the ME; or
configured in the UICC; or
preconfigured in the ME and configured in the UICC; or
provided/updated by the V2X Application Server via PCF and/or V1 reference point; or
provided/updated by the PCF to the UE.

The basic principles of service authorization and provisioning for V2X communication over PC5 reference point and provisioning for V2X communication over Uu reference point are:

The UE may be authorized to use V2X communication over PC5 reference point on a per PLMN basis by the PCF in the HPLMN.

The PCF in the HPLMN merges authorization information from home and other PLMNs and provides the UE with the final authorization information.

The PCF in the VPLMN or HPLMN may revoke the authorization (via H-PCF when roaming) at any time by using the UE Configuration Update procedure for transparent UE Policy delivery procedure defined in clause 4.2.4.3 of TS 23.502 [7].

The provisioning to UE for V2X communication over PC5 and Uu reference points is controlled by the PCF and may be triggered by UE. The PCF includes the V2X Policy/parameters for V2X communications over PC5 reference point as specified in clause 5.1.2.1 and/or the V2X Policy/parameters for V2X communications over Uu reference point as specified in clause 5.1.3.1 into a Policy Section identified by a Policy Section Identifier (PSI) as specified in clause 6.1.2.2.2 of TS 23.503 [16].

5.1.2 Authorization and Provisioning for V2X Communications Over PC5 Reference Point 5.1.2.1 Policy/Parameter Provisioning The following information for V2X communications over PC5 reference point is provisioned to the UE:

1) Authorization Policy:
When the UE is "served by E-UTRA" or "served by NR":
PLMNs in which the UE is authorized to perform V2X communications over PC5 reference point when "served by E-UTRA" or "served by NR".
For each above PLMN:
RAT(s) over which the UE is authorized to perform V2X communications over PC5 reference point.
When the UE is "not served by E-UTRA" and "not served by NR":
Indicates whether the UE is authorized to perform V2X communications over PC5 reference point when "not served by E-UTRA" and "not served by NR".
RAT(s) over which the UE is authorized to perform V2X communications over PC5 reference point.

2) Radio Parameters when the UE is "not Served by E-UTRA" and "not Served by NR":
Includes the radio parameters per PC5 RAT (i.e. LTE PC5, NR PC5) with Geographical Area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.
Editor's note: The radio parameters (e.g. frequency bands) are to be defined by RAN WGs. The reference to RAN specification will be added when defined in RAN WGs.
NOTE 1: Whether a frequency band is "operator managed" or "non-operator managed" in a given Geographical Area is defined by local regulations.

3) Policy/Parameters Per RAT for PC5 Tx Profile Selection:
The mapping of service types (e.g. PSIDs or ITS-AIDS) to Tx Profiles.
Editor's note: The Tx Profiles are to be defined by RAN WGs. The reference to RAN specification will be added when defined in RAN WGs.

4) Policy/Parameters Related to Privacy:
The list of V2X services, e.g. PSIDs or ITS-AIDS of the V2X applications, with Geographical Area(s) that require privacy support.

5) Policy/Parameters when LTE PC5 is Selected:
Same as specified in TS 23.285 [8] clause 4.4.1.1.2 item 3) Policy/parameters except for the mapping of service types to Tx Profiles and the list of V2X services with Geographical Area(s) that require privacy support.

6) Policy/Parameters when NR PC5 is Selected:
The mapping of service types (e.g. PSIDs or ITS-AIDS) to V2X frequencies with Geographical Area(s).
The mapping of Destination Layer-2 ID(s) and the V2X services, e.g. PSIDs or ITS-AIDS of the V2X application for broadcast.
The mapping of Destination Layer-2 ID(s) and the V2X services, e.g. PSIDs or ITS-AIDS of the V2X application for groupcast.
The mapping of default Destination Layer-2 ID(s) for initial signalling to establish unicast connection and the V2X services, e.g. PSIDs or ITS-AIDS of the V2X application.
NOTE 2: The same default Destination Layer-2 ID for unicast initial signaling can be mapped to more than one V2X services. In the case where different V2X services are mapped to distinct default Destination Layer-2 IDs, when the UE intends to establish a single unicast link that can be used for more than one V2X services, the UE can select any of the default Destination Layer-2 IDs to use for the initial signaling.
PC5 QoS mapping configuration:
Input from V2X application layer:
V2X service (e.g. PSID or ITS-AID).
(Optional) V2X Application Requirements for the V2X service, e.g. priority requirement, reliability requirement, delay requirement, range requirement.
NOTE 3: Details of V2X Application Requirements for the V2X service is up to implementation and out of scope of this specification.

Output:
PC5 QoS parameters defined in clause 5.4.2 (i.e. PQI and conditionally other parameters such as MFBR/GFBR, etc).
SLRB configurations, i.e. the mapping of PC5 QoS profile(s) to SLRB(s), when the UE is "not served by E-UTRA" and "not served by NR".
The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.
Editor's note: The SLRB configurations will be determined by RAN WGs. The reference to RAN specification will be added when defined in RAN WGs.
Editor's note: For the PC5 QoS profile, coordination with RAN WGs is needed.
Editor's note: The V2X frequencies with Geographical Area(s) will be determined by RAN WGs. The reference to RAN specification will be added when defined in RAN WGs.

5.1.2.2 Principles for Applying Parameters for V2X Communications Over PC5 Reference Point For V2X communication over PC5 reference point, the operator may pre-configure the UEs with the required provisioning parameters for V2X communication, without the need for the UEs to connect to the 5GC to get this initial configuration. The following apply:
The provisioning parameters for V2X communications over PC5 reference point may be configured in the UICC, in the ME, or in both the UICC and the ME.
The ME provisioning parameters shall not be erased when a USIM is deselected or replaced.
If both the UICC and the ME contain the same set of overlapping provisioning parameters, the set of parameters from the UICC shall take precedence.
The provisioning parameters from the PCF shall take precedence over the pre-configured parameters in the ME and UICC.
The UE shall use radio resources for V2X communications over PC5 reference point as follows:
While a UE has a serving cell and is camped on a cell and the UE intends to use for V2X service the radio resources (i.e. carrier frequency) operated by this cell, then the UE shall use the radio resource description indicated by this cell the UE is camped on and ignore any radio resource description of the same radio resource provisioned in the ME or the UICC. If the cell does not provide radio resources for V2X service, the UE shall not perform V2X message transmission and reception on radio resources operated by this cell.
If the UE intends to use "operator-managed" radio resources (i.e. carrier frequency) for V2X service that are not operated by the UE's serving cell, as specified in clause 5.1.2.1, or if the UE is out of coverage, the UE shall search for a cell in any PLMN that is operating the provisioned radio resources (i.e. carrier frequency) as defined in TS 36.300 [9] and TS 36.304 [10] (if LTE based PC5 is selected for the V2X communication) or as defined in TS 38.300 [11] and TS 38.304 [12] (if NR based PC5 is selected for the V2X communication), and:
If the UE finds such a cell in the registered PLMN or a PLMN equivalent to the registered PLMN, and authorization for V2X communications over PC5 reference point to this PLMN is confirmed, the UE shall use the radio resource description indicated by that cell. If that cell does not provide radio resources for V2X service, the UE shall not perform V2X message transmission and reception on those radio resources.
If the UE finds such a cell but not in the registered PLMN or a PLMN equivalent to the registered PLMN, and that cell belongs to a PLMN authorized for V2X communications over PC5 reference point and provides radio resources for V2X service then the UE shall perform PLMN selection triggered by V2X communications over PC5 reference point as defined in TS 23.122 [13]. If the UE has an ongoing emergency session via IMS, it shall not trigger any PLMN selection due to V2X communication over PC5 reference point.
If the UE finds such cell but not in a PLMN authorized for V2X communications over PC5 reference point the UE shall not use V2X communications over PC5 reference point.
If the UE does not find any such cell in any PLMN, then the UE shall consider itself "not served by NR or E-UTRA" and use radio resources provisioned in the ME or the UICC. If no such provision exists in the ME or the UICC or the provision does not authorize V2X communications over PC5 reference point, then the UE is not authorized to transmit.
If the UE intends to use "non-operator-managed" radio resources (i.e. carrier frequency) for V2X service, according to TS 36.331 [14] or TS 38.331 [15] and as specified in clause 5.1.2.1, then the UE shall perform V2X communication over PC5 using resource provisioned in the ME or the UICC. If no such provision exists in the ME or the UICC or the provision does not authorize V2X communications over PC5 reference point, then the UE is not authorized to transmit.
The UE provisioning shall support setting Geographical Areas.
NOTE 1: It is possible for a UE to use other radio resources for V2X service based on the Geographical Area instead of those operated by the serving NG-RAN cell, when provisioned in the UE, even if the UE's serving cell offers normal service and the SIBxy indicates that the service (V2X communication) is available. This is to cover the scenario when e.g. the radio resources used for V2X communications over PC5 reference point are not owned by the serving network of the UE.
Editor's note: The SIBxy numbering and reference needs to be updated based on RAN WG's definition.
NOTE 2: When cross-carrier operation is supported, according to TS 36.331 [14] or TS 38.331 [15], a UE can be instructed by its serving cell to perform V2X communication over a different carrier frequency. The UE is still considered as "served by NR or E-UTRA" in this case.
NOTE 3: The scenario that a cell is detected and the cell does not provide support for V2X communications over PC5 reference point when the UE attempts to use a carrier frequency configured for V2X communications over PC5 reference point, is considered a configuration error. Therefore, the UE does not transmit on that frequency to avoid interference to the network.
The V2X communications over PC5 reference point is only specified for E-UTRA and NR.
NOTE 4: It is out of scope of the present specification to define how the UE can locate itself in a specific Geographical Area. When the UE is in coverage of a 3GPP RAT, it can for example, use information derived from the serving PLMN. When the UE is not in coverage of a 3GPP RAT, it can use other techniques, e.g. Global Navigation Satellite System (GNSS). User provided location is not a valid input.

5.2 V2X Communication
5.2.1 V2X Communication Over PC5 Reference Point
5.2.1.1 General For V2X communication, two types of PC5 reference points exist: the LTE based PC5 reference point as defined in TS 23.285 [8], and the NR based PC5 reference point as defined in clause 4.2.3. A UE may use either type of PC5 or both for V2X communication depending on the services the UE supports. The V2X communication over PC5 reference point supports roaming and inter-PLMN operations. V2X communication over PC5 reference point is supported when UE is "served by NR or E-UTRA" or when the UE is "not served by NR or E-UTRA".

A UE is authorized to transmit and receive V2X messages when it has valid authorization and configuration as specified in clause 5.1.2.

The V2X communication over PC5 reference point has the following characteristics:

- V2X communication over LTE based PC5 reference point is connectionless, i.e. broadcast mode at Access Stratum (AS) layer, and there is no signalling over PC5 for connection establishment.
- V2X communication over NR based PC5 reference point supports broadcast mode, groupcast mode, and unicast mode at AS layer. The UE will indicate the mode of communication for a V2X message to the AS layer. Signalling over control plane over PC5 reference point for unicast mode communication management is supported.
- V2X services communication support between UEs over PC5 user plane.
- V2X messages are exchanged between UEs over PC5 user plane.
- Both IP based and non-IP based V2X messages are supported over PC5 reference point.
- For IP based V2X messages, only IPv6 is used. IPv4 is not supported.

The identifiers used in the V2X communication over PC5 reference point are described in clause 5.6.1. UE decides on the type of PC5 reference point and Tx Profile to use for the transmission of a particular packet based on the configuration described in clause 5.1.2. When the LTE based PC5 reference point is selected, the QoS handling corresponding procedures are defined in TS 23.285 [8]. When NR based PC5 reference point is selected, the QoS handling and procedures are defined in clauses 5.4.1 and 6.3.

If the UE has an ongoing emergency session via IMS, the ongoing emergency session via IMS shall be prioritized over V2X communication over PC5 reference point.

NOTE: The emergency session via IMS setup is based on appropriate regional/national regulatory requirements and operator policies as defined in TS 23.501 [6].

5.2.1.4 Unicast Mode Communication Over PC5 Reference Point

Figure 5:
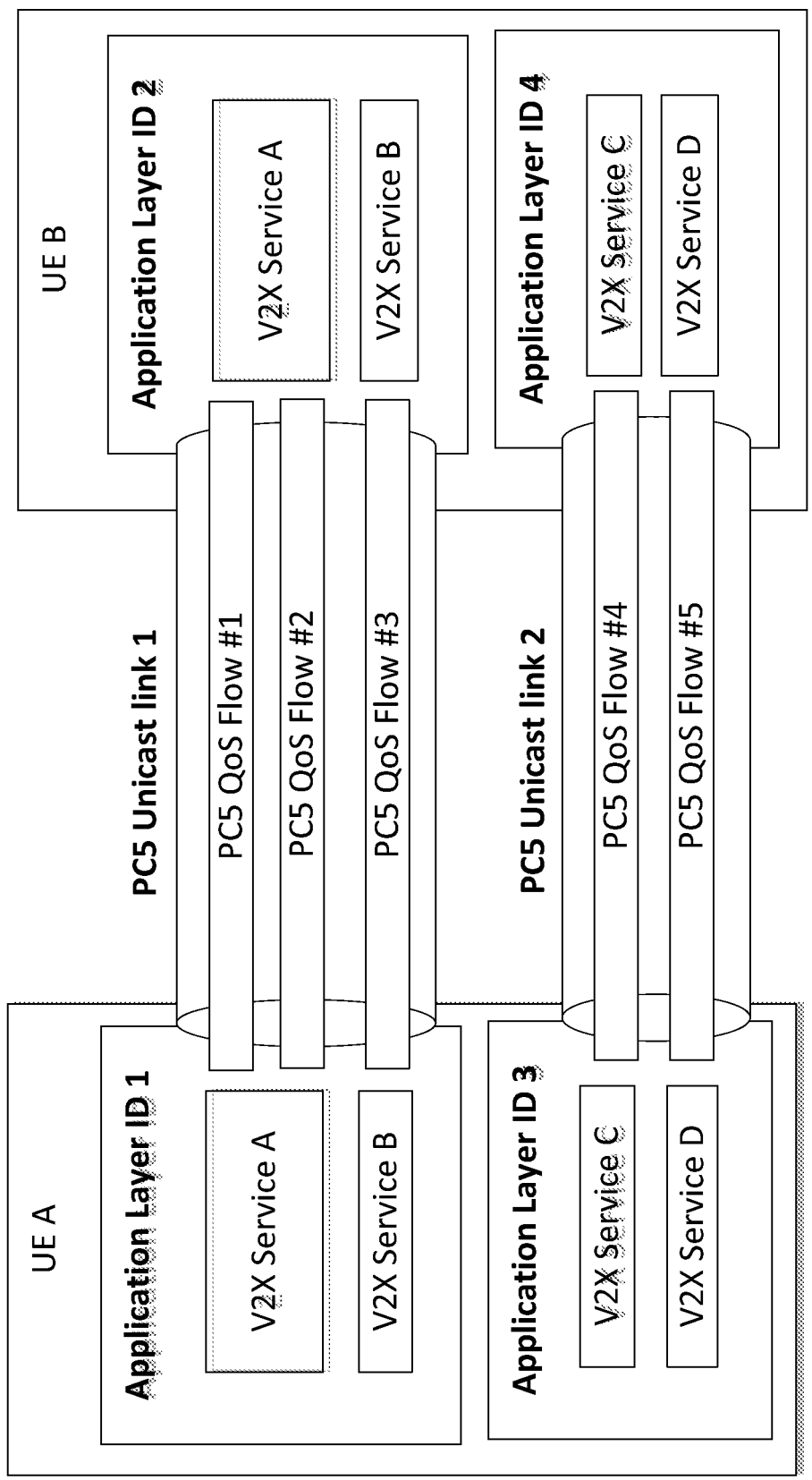
FIG. 5 is a reproduction of FIG. 5.2.1.4-1 of 3GPP TS 23.287 V1.1.0.

Unicast mode of communication is only supported over NR based PC5 reference point. FIG. 5.2.1.4-1 illustrates an example of PC5 unicast links.

FIG. 5.2.1.4-1 of 3GPP TS 23.287 V1.1.0, Entitled "Example of PC5 Unicast Links", is Reproduced as FIG. 5

The following principles apply when the V2X communication is carried over PC5 unicast link:

- A PC5 unicast link between two UEs allows V2X communication between one or more pairs of peer V2X services in these UEs. All V2X services in the UE using the same PC5 unicast link use the same Application Layer ID.

NOTE 1: An Application Layer ID may change in time as described in clauses 5.6.1.1 and 6.3.3.2, due to privacy. This does not cause a re-establishment of a PC5 unicast link.

- One PC5 unicast link supports one or more V2X services (e.g. PSIDs or ITS-AIDs) if these V2X services are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.

NOTE 2: A source UE is not required to know whether different target Application Layer IDs over different PC5 unicast links belong to the same target UE.

- A PC5 unicast link supports V2X communication using a single network layer protocol e.g. IP or non-IP.
- A PC5 unicast link supports per-flow QoS model as specified in clause 5.4.1.

When the Application layer in the UE initiates data transfer for a V2X service which requires unicast mode of communication over PC5 reference point:

- the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service as specified in clause 6.3.3.4; otherwise
- the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

- service type(s) (e.g. PSID or ITS-AID), Application Layer ID and Layer-2 ID of UE A; and
- Application Layer ID and Layer-2 ID of UE B; and
- network layer protocol used on the PC5 unicast link; and
- for each V2X service, a set of PC5 QoS Flow Identifier(s) (PFI(s)). Each PFI is associated with QoS parameters (i.e. PQI and optionally Range).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

The Unicast Link Profile shall be updated accordingly after a Layer-2 link modification for an established PC5 unicast link as specified in clause 6.3.3.4.

5.2.1.5 IP Address Allocation

For unicast mode of V2X communication over PC5 reference point, the following mechanism for IP address/prefix allocation may be used:

a) IPv6 Stateless Address auto configuration specified in RFC 4862 [21] for assignment of IPv6 prefix, with one of the two UEs acting as IPv6 default router.

NOTE: Which UE acts as an IPv6 default router is negotiated during secure layer-2 link establishment by exchanging the IP Address Configuration as described in clause 6.3.3.1.

b) IPv6 link-local addresses as defined in RFC 4862 [21] are formed by UEs locally. The IPv6 link-local addresses are exchanged during the establishment of a secure layer-2 link over PC5 reference point as described in clause 6.3.3.1. The UEs shall disable duplicate address detection after the layer-2 link is established.

6.1.1 User Plane for NR PC5 Reference Point Supporting V2X Services

Figure 6:
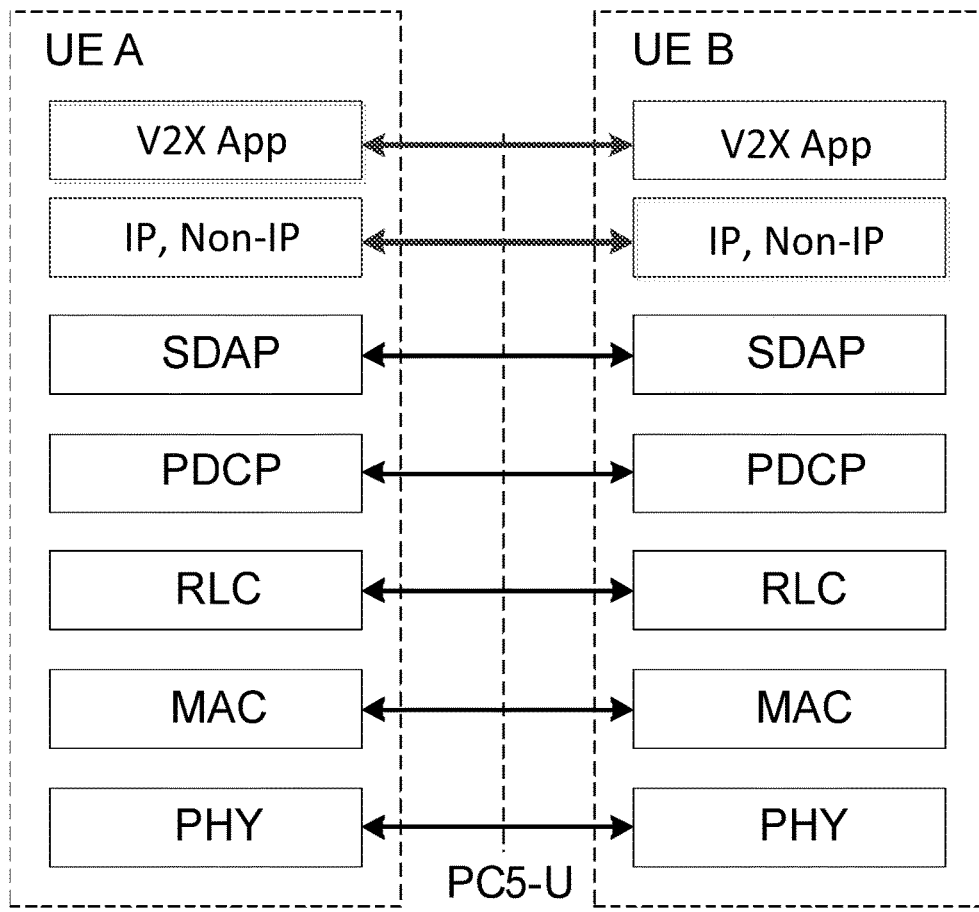
FIG. 6 is a reproduction of FIG. 6.1.1-1 of 3GPP TS 23.287 V1.1.0.

FIG. 6.1.1-1 of 3GPP TS 23.287 V1.1.0, Entitled "User Plane for PC5 Interface", is Reproduced as FIG. 6

IP and Non-IP PDCP SDU types are supported for the V2X communication over PC5.

For IP PDCP SDU type, only IPv6 is supported. The IP address allocation and configuration are as defined in clause 5.6.1.1.

The Non-IP PDCP SDU contains a Non-IP Type header, which indicates the V2X message family used by the application layer, e.g. IEEE 1609 family's WSMP [18], ISO defined FNTP [19].

NOTE: The Non-IP Type header and allowed values will be defined in stage 3 specification.

3GPP TS 38.885 specifies QoS management for NR V2X sidelink as follows:

7 QoS Management

QoS management is relevant to V2X in the context of its use in resource allocation, congestion control, in-device coexistence, power control and SLRB configuration. Physical layer parameters related to QoS management are the priority, latency, reliability and minimum required communication range (as defined by higher layers) of the traffic being delivered. Data rate requirements are also supported in the AS. A SL congestion metric and, at least in resource allocation mode 2, mechanisms for congestion control are needed. It is beneficial to report the SL congestion metric to gNB.

For SL unicast, groupcast and broadcast, QoS parameters of V2X packets are provided by upper layers to the AS. For SL unicast, the SLRBs are (pre-)configured based on the signalling flows and procedures shown in FIGS. 7-1 and 7-2. The per-flow QoS model described in [6] is assumed in upper layers.

Figure 7:
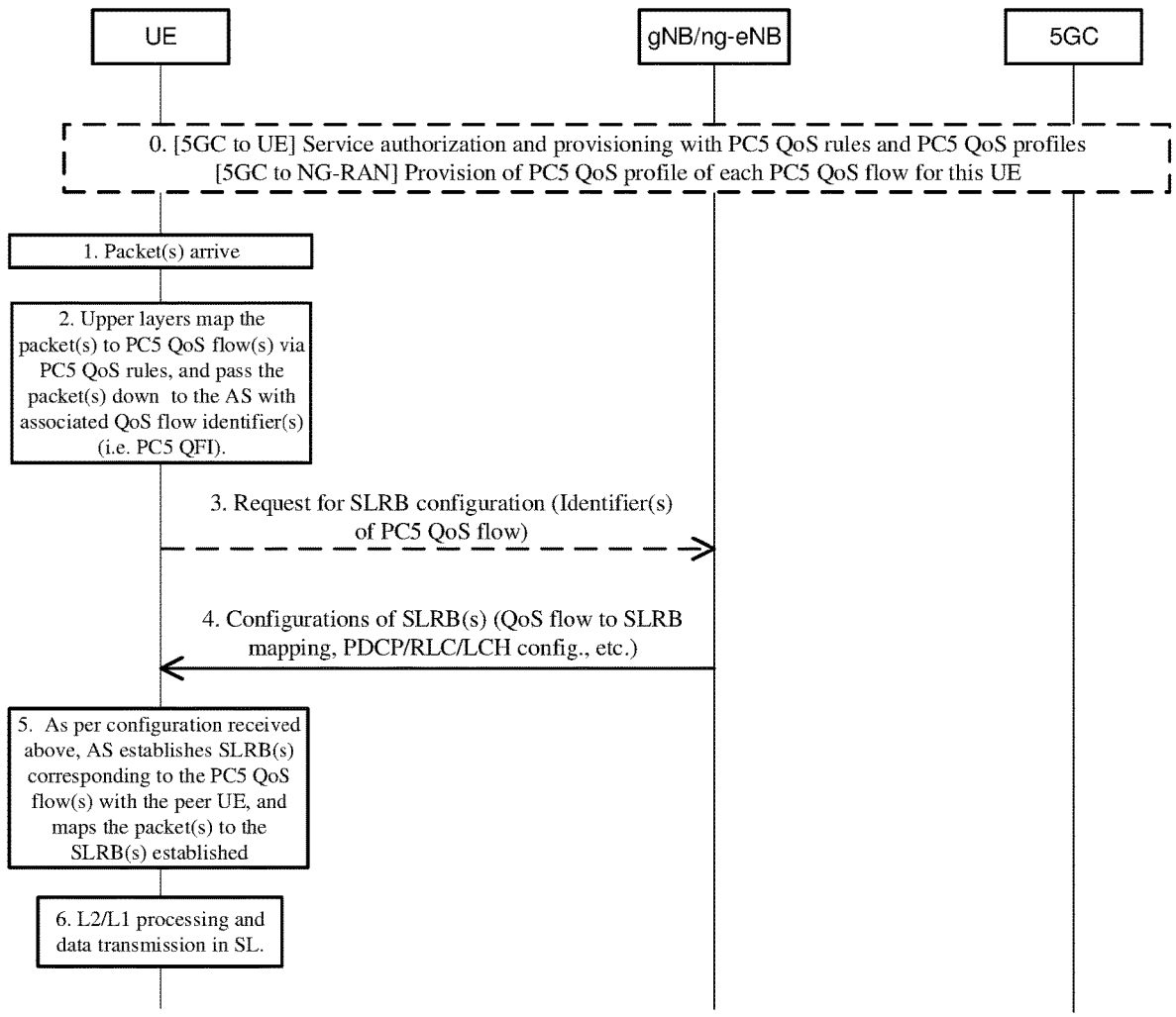
FIG. 7 is a reproduction of FIG. 7-1 of 3GPP TS 38.885 V16.0.0.

FIG. 7-1 of 3GPP TS 38.885 V16.0.0, Entitled "SLRB Configuration for SL Unicast (UE-Specific)", is Reproduced as FIG. 7

In Step 0 of FIG. 7-1, the PC5 QoS profile, i.e. a set of specific PC5 QoS parameters, and PC5 QoS rule for each PC5 QoS flow are provisioned to the UE in advance by service authorization and provisioning procedures as in [6]; similarly, PC5 QoS profile for each QoS flow is also provisioned to the gNB/ng-eNB in advance. Then, when packet(s) arrive, the UE can first derive the identifier of the associated PC5 QoS flow(s) (i.e. PC5 QFI) based on the PC5 QoS rules configured in Step 0, and may then report the derived PC5 QFI(s) to the gNB/ng-eNB in Step 3. The gNB/ng-eNB can derive the QoS profile(s) of these reported PC5 QFI(s) based on the provisioning from 5GC in Step 0, and may signal the configurations of the SLRB(s) associated with the PC5 QFI(s) UE reported via RRC dedicated signalling in Step 4. These SLRB configurations may include PC5 QoS flow to SLRB mapping, SDAP/PDCP/RLC/LCH configurations, etc. In Step 5, the UE in the AS establishes SLRB(s) associated with the PC5 QFI(s) of the packet(s) with the peer UE as per gNB/ng-eNB configuration, and maps available packet(s) to the SLRB(s) established. SL unicast transmission can then occur.

NOTE: How the PC5 QFI is defined is up to SA2 WG2.

Figure 8:
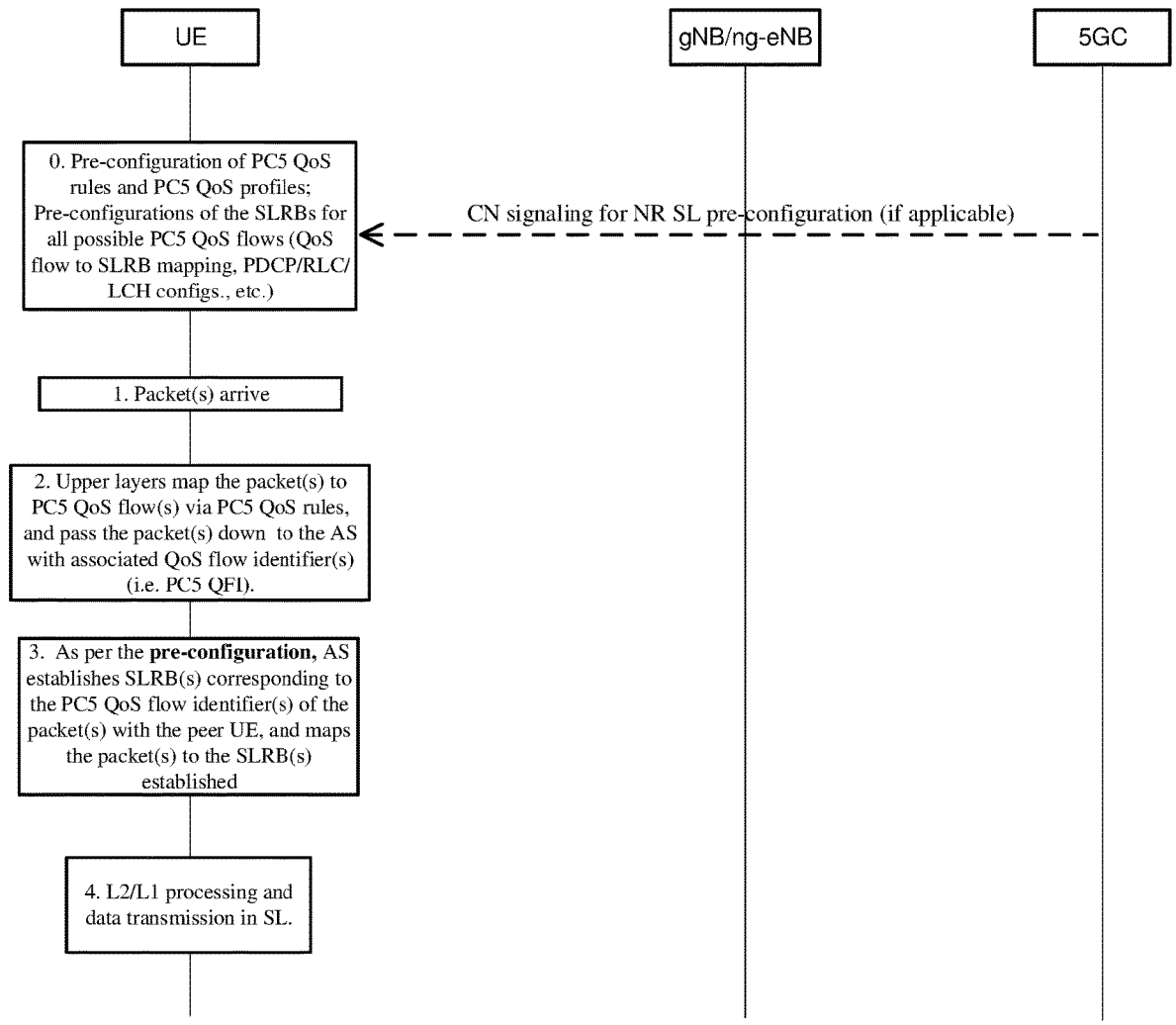
FIG. 8 is a reproduction of FIG. 7-2 of 3GPP TS 38.885 V16.0.0.

FIG. 7-2 of 3GPP TS 38.885 V16.0.0, Entitled "SLRB Configuration for SL Unicast (Pre-Configuration Based)", is Reproduced as FIG. 8

In FIG. 7-2, both the PC5 QoS rules which are used in the upper layers for filtering and the SLRB configuration for each PC5 QoS flow in the AS layer are pre-configured as in Step 0 (either via CN signalling, pre-configured in UICC or pre-configured in ME [6]). In Step 1-3, the UE derives the identifier of the associated PC5 QoS flow(s) for the arriving packets, autonomously sets up associated SLRB(s) with the peer UE depending on the pre-configuration, and maps the packet(s) into corresponding SLRB(s) based on their associated PC5 QoS flow identifiers. SL unicast transmission can then occur.

For NR SL unicast, the PC5 QoS flow to SLRB mapping is performed in the SDAP layer of the UE. Some SLRB configurations (including at least SN length, RLC mode and PC5 QoS profile associated with each SLRB) for unicast need to be informed by one UE to the peer UE in SL, when they are (pre-)configured at the UE.

For V2X sidelink transmission in SL groupcast and broadcast, the SLRB configurations are (pre)configured based on the signalling flows and procedures shown in FIG. 7-3, FIG. 7-4 and FIG. 7-5 below. For SL groupcast and broadcast, the per-packet QoS model described in [6] is assumed in the upper layers; particularly, PQI and other potential QoS parameters (if any) are set by the UE's upper layers to represent a set of per-packet PC5 QoS parameters, i.e. the PC5 QoS profile, which are tagged on each V2X packet submitted to the AS.

3GPP TS 36.331 specifies the following Sidelink UE information related to sidelink communications as follows:

5.10.2 Sidelink UE Information 5.10.2.1 General

Figures 9, 10:
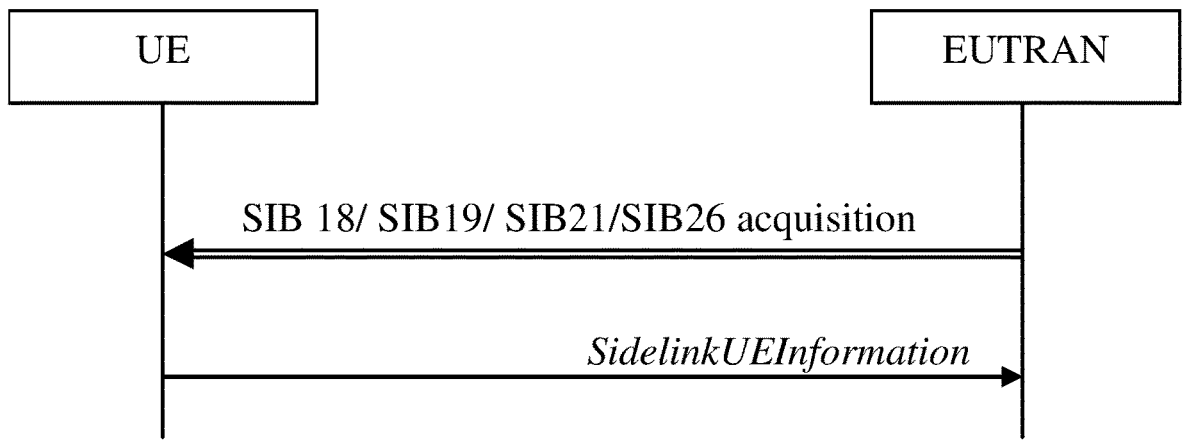
FIG. 9 is a reproduction of FIG. 5.10.2-1 of 3GPP TS 36.331 V15.3.0.
FIG. 10 is a reproduction of Table 5.5.1-1 of 3GPP TS 36.323 V15.3.0.

FIG. 5.10.2-1 of 3GPP TS 36.331 V15.3.0, Entitled "Sidelink UE Information", is Reproduced as FIG. 9

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon or SystemInformationBlockType26 does not include the resources for transmission (in normal conditions), initiates connection establishment in accordance with 5.3.3.1a.

Upon initiating the procedure, the UE shall:
1> if SystemInformationBlockType21 including sl-V2X-ConfigCommon is broadcast by the PCell:
  2> ensure having a valid version of SystemInformationBlockType21 and SystemInformationBlockType26, if broadcast, for the PCell;
  2> if configured by upper layers to receive V2X sidelink communication on a primary frequency or on one or more frequencies included in v2x-InterFreqInfoList, if included in SystemInformationBlockType21 or SystemInformationBlockType26 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:
      4> initiate transmission of the SidelinkUEInformation message to indicate the V2X sidelink communication reception frequency(ies) of interest in accordance with 5.10.2.3;
  2> else:
    3> if the last transmission of the SidelinkUEInformation message included v2x-CommRxInterestedFreqList:
      4> initiate transmission of the SidelinkUEInformation message to indicate it is no longer interested in V2X sidelink communication reception in accordance with 5.10.2.3;
  2> if configured by upper layers to transmit V2X sidelink communication on a primary frequency or on one or more frequencies included in v2x-InterFreqInfoList, if included in SystemInformationBlockType21 or SystemInformationBlockType26 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommTxResourceReq; or if the information carried by the v2x-CommTxResourceReq has changed since the last transmission of the SidelinkUEInformation message:
      4> initiate transmission of the SidelinkUEInformation message to indicate the V2X sidelink communication transmission resources required by the UE in accordance with 5.10.2.3;
  2> else:
    3> if the last transmission of the SidelinkUEInformation message included v2x-CommTxResourceReq:
      4> initiate transmission of the SidelinkUEInformation message to indicate it no longer requires V2X sidelink communication transmission resources in accordance with 5.10.2.3;

SidelinkUEInformation

The SidelinkUEInformation message is used for the indication of sidelink information to the eNB.

Signalling radio bearer: SRB1
RLC-SAP: AM
Logical channel: DCCH
Direction: UE to E-UTRAN
SidelinkUEInformation Message

| SidelinkUEInformation message |
| --- |
| -- ASN1START |
| ... |
| SidelinkUEInformation-v1430-IEs ::=    SEQUENCE { |
|     v2x-CommRxInterestedFreqList-r14    SL-V2X-CommFreqList-r14    OPTIONAL, |
|     p2x-CommTxType-r14    ENUMERATED {true}    OPTIONAL, |
|     v2x-CommTxResourceReq-r14    SL-V2X-CommTxFreqList-r14    OPTIONAL, |
|     nonCriticalExtension    SidelinkUEInformation-v1530-IEs |
|     OPTIONAL |
| } |

-continued

| SidelinkUEInformation message |
| --- |

```
SidelinkUEInformation-v1530-IEs ::=    SEQUENCE {
    reliabilityInfoListSL-r15              SL-ReliabilityList-r15        OPTIONAL,
    nonCriticalExtension                   SEQUENCE { }                  OPTIONAL
}
...
SL-V2X-CommFreqList-r14 ::= SEQUENCE (SIZE (1..maxFreqV2X-r14)) OF INTEGER
(0..maxFreqV2X-1-r14)
SL-V2X-CommTxFreqList-r14 ::= SEQUENCE (SIZE (1..maxFreqV2X-r14)) OF
SL-V2X-CommTxResourceReq-r14
SL-V2X-CommTxResourceReq-r14 ::=       SEQUENCE {
    carrierFreqCommTx-r14                  INTEGER (0.. maxFreqV2X-1-r14}   OPTIONAL,
    v2x-TypeTxSync-r14                     SL-TypeTxSync-r14             OPTIONAL,
    v2x-DestinationInfoList-r14            SL-DestinationInfoList-r12    OPTIONAL
}
-- ASN1STOP
```

| SidelinkUEInformation field descriptions |
| --- |
| carrierFreqCommTx |
| Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency. |
| commRxInterestedFreq |
| Indicates the frequency on which the UE is interested to receive sidelink communication. |
| commTxResourceReq |
| Indicates the frequency on which the UE is interested to transmit non-relay related sidelink communication as well as the one-to-many sidelink communication transmission destination(s) for which the UE requests E-UTRAN to assign dedicated resources. NOTE 1. |
| reliabilityInfoListSL |
| Indicates the reliability(ies) (i.e., PPPRs [9]) associated with the reported traffic to be transmitted for V2X sidelink communication. |
| v2x-CommRxInterestedFreqList |
| Indicates the index(es) of the frequency(ies) on which the UE is interested to receive V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency. |
| v2x-DestinationInfoList |
| Indicates the destination(s) for V2X sidelink communication. |
| v2x-TypeTxSync |
| Indicates the synchronization reference used by the UE. |

3GPP TS 36.323 specifies header compression and decompression performed in the PDCP layer as follows:

5.5 Header Compression and Decompression 5.5.1 Supported Header Compression Protocols and Profiles The header compression protocol is based on the Robust Header Compression (ROHC) framework [7]. There are multiple header compression algorithms, called profiles, defined for the ROHC framework. Each profile is specific to the particular network layer, transport layer or upper layer protocol combination e.g. TCP/IP and RTP/UDP/IP.

The detailed definition of the ROHC channel is specified as part of the ROHC framework in RFC 5795 [7]. This includes how to multiplex different flows (header compressed or not) over the ROHC channel, as well as how to associate a specific IP flow with a specific context state during initialization of the compression algorithm for that flow.

The implementation of the functionality of the ROHC framework and of the functionality of the supported header compression profiles is not covered in this specification.

In this version of the specification the support of the following profiles is described:

Table 5.5.1-1 of 3GPP TS 36.323 V15.3.0, Entitled "Supported Header Compression Protocols and Profiles", is Reproduced as FIG. 10

5.5.2 Configuration of Header Compression

PDCP entities associated with DRBs can be configured by upper layers, see TS 36.331 [3] to use header compression either bidirectional (if headerCompression is configured) or uplink-only (if uplinkOnlyHeaderCompression is configured). If uplinkOnlyHeaderCompression is configured, the UE shall process the received PDCP Control PDU for interspersed ROHC feedback packet corresponding to the uplink header compression as specified in subclause 5.5.6.2, but shall not perform header decompression for the received PDCP Data PDU. PDCP entities associated with SLRBs can be configured to use header compression for IP SDUs.

5.5.3 Protocol Parameters

RFC 5795 has configuration parameters that are mandatory and that must be configured by upper layers between compressor and decompressor peers [7]; these parameters define the ROHC channel. The ROHC channel is a unidirectional channel, i.e. there is one channel for the downlink, and one for the uplink if headerCompression is configured, and there is only one channel for the uplink if uplinkOnlyHeaderCompression is configured. There is thus one set of parameters for each channel, and the same values shall be used for both channels belonging to the same PDCP entity if headerCompression is configured.

These parameters are categorized in two different groups, as defined below:
M: Mandatory and configured by upper layers.
N/A: Not used in this specification.

The usage and definition of the parameters shall be as specified below.
MAX_CID (M): This is the maximum CID value that can be used. One CID value shall always be reserved for uncompressed flows. The parameter MAX_CID is configured by upper layers (maxCID, see TS 36.331 [3]).
LARGE_CIDS: This value is not configured by upper layers, but rather it is inferred from the configured value of MAX_CID according to the following rule:
If MAX_CID>15 then LARGE_CIDS=TRUE else LARGE_CIDS=FALSE.
PROFILES (M): Profiles are used to define which profiles are allowed to be used by the UE. The list of supported profiles is described in section 5.5.1. The parameter PROFILES is configured by upper layers (profiles for uplink and downlink, rohc-Profiles in SL-Preconfiguration or SL-V2X-Preconfiguration for sidelink, see TS 36.331 [3]).
FEEDBACK_FOR (N/A): This is a reference to the channel in the opposite direction between two compression endpoints and indicates to what channel any feedback sent refers to. Feedback received on one ROHC channel for this PDCP entity shall always refer to the ROHC channel in the opposite direction for this same PDCP entity.
MRRU (N/A): ROHC segmentation is not used.

5.5.4 Header Compression

The header compression protocol generates two types of output packets:
compressed packets, each associated with one PDCP SDU
standalone packets not associated with a PDCP SDU, i.e. interspersed ROHC feedback packets
A compressed packet is associated with the same PDCP SN and COUNT value as the related PDCP SDU.
Interspersed ROHC feedback packets are not associated with a PDCP SDU. They are not associated with a PDCP SN and are not ciphered.
NOTE: If the MAX_CID number of ROHC contexts are already established for the compressed flows and a new IP flow does not match any established ROHC context, the compressor should associate the new IP flow with one of the ROHC CIDs allocated for the existing compressed flows or send PDCP SDUs belonging to the IP flow as uncompressed packet.

5.5.5 Header Decompression

If header compression is configured by upper layers for PDCP entities associated with u-plane data the PDCP PDUs are de-compressed by the header compression protocol after performing deciphering as explained in the subclause 5.6.

5.5.6 PDCP Control PDU for Interspersed ROHC Feedback 5.5.6.1 Transmit Operation When an interspersed ROHC feedback packet is generated by the header compression protocol, the UE shall:
submit to lower layers the corresponding PDCP Control PDU as specified in subclause 6.2.5 i.e. without associating a PDCP SN, nor performing ciphering.

5.5.6.2 Receive Operation

At reception of a PDCP Control PDU for interspersed ROHC feedback packet from lower layers, the UE shall:
deliver the corresponding interspersed ROHC feedback packet to the header compression protocol without performing deciphering.

In LTE, a Packet Data Convergence Protocol (PDCP) configuration for a data radio bearer (DRB) may contain the following parameters (as discussed in 3GPP TS 36.331):
PDCP-Config
The IE PDCP-Config is used to set the configurable PDCP parameters for data radio bearers.
PDCP-Config Information Element

| PDCP-Config information element |
| --- |

```
-- ASN1START
PDCP-Config ::=                    SEQUENCE {
    discardTimer                       ENUMERATED {
                                           ms50, ms100, ms150, ms300, ms500,
                                           ms750, ms1500, infinity
                                       }                                    OPTIONAL,         -- Cond Setup
    rlc-AM                             SEQUENCE {
        statusReportRequired               BOOLEAN
                                       }                                    OPTIONAL,         -- Cond Rlc-AM
    rlc-UM                             SEQUENCE {
        pdcp-SN-Size                       ENUMERATED {len7bits, len12bits}
                                       }                                    OPTIONAL,         -- Cond Rlc-UM
    headerCompression                  CHOICE {
        notUsed                            NULL,
        rohc                               SEQUENCE {
            maxCID                             INTEGER (1..16383)                             DEFAULT 15,
            profiles                           SEQUENCE {
                profile0x0001                      BOOLEAN,
                profile0x0002                      BOOLEAN,
                profile0x0003                      BOOLEAN,
```

| PDCP-Config information element |
|---|
| ```
                    profile0x0004              BOOLEAN,
                    profile0x0006              BOOLEAN,
                    profile0x0101              BOOLEAN,
                    profile0x0102              BOOLEAN,
                    profile0x0103              BOOLEAN,
                    profile0x0104              BOOLEAN
                },
                ...
            }
        },
        ...,
        [[ rn-IntegrityProtection-r10         ENUMERATED {enabled}        OPTIONAL           -- Cond RN
        ]],
        [[ pdcp-SN-Size-v1130                 ENUMERATED {len15bits}      OPTIONAL           -- Cond Rlc-AM2
        ]],
        [[ ul-DataSplitDRB-ViaSCG-r12         BOOLEAN    OPTIONAL,        -- Need ON
            t-Reordering-r12
                                              ENUMERATED {
                                              ms0, ms20, ms40, ms60, ms80, ms100, ms120, ms140,
                                              ms160, ms180, ms200, ms220, ms240, ms260, ms280, ms300,
                                              ms500, ms750, spare14, spare13, spare12, spare11,
spare10,
                                              spare9, spare8, spare7, spare6, spare5, spare4, spare3,
                                              spare2, spare1}             OPTIONAL           -- Cond
SetupS
        ]],
        [[ ul-DataSplitThreshold-r13          CHOICE {
                release                       NULL,
                setup                         ENUMERATED {
                                              b0, b100, b200, b400, b800, b1600, b3200, b6400, b12800,
                                              b25600, b51200, b102400, b204800, b409600, b819200,
                                              spare1}
            }                                                             OPTIONAL,          -- Need ON
            pdcp-SN-Size-v1310                ENUMERATED {len18bits}      OPTIONAL, -- Cond Rlc-AM3
            statusFeedback-r13                CHOICE {
                release                       NULL,
                setup                         SEQUENCE {
                    statusPDU-TypeForPolling-r13  ENUMERATED {type1, type2}               OPTIONAL,
-- Need ON
                    statusPDU-Periodicity-Type1-r13   ENUMERATED {
                                              ms5, ms10, ms20, ms30, ms40, ms50, ms60, ms70, ms80,
ms90,
                                              ms100, ms150, ms200, ms300, ms500, ms1000, ms2000,
ms5000,
                                              ms10000, ms20000, ms50000}  OPTIONAL,         -- Need ON
                    statusPDU-Periodicity-Type2-r13   ENUMERATED {
                                              ms5, ms10, ms20, ms30, ms40, ms50, ms60, ms70, ms80,
ms90,
                                              ms100, ms150, ms200, ms300, ms500, ms1000, ms2000,
ms5000,
                                              ms10000, ms20000, ms50000}  OPTIONAL,         -- Need ON
                    statusPDU-Periodicity-Offset-r13  ENUMERATED {
                                              ms1, ms2, ms5, ms10, ms25, ms50, ms100, ms250, ms500,
                                              ms2500, ms5000, ms25000}    OPTIONAL          -- Need ON
                }
            }                                                             OPTIONAL          -- Need ON
        ]],
        [[ ul-LWA-Config-r14                  CHOICE {
                release                       NULL,
                setup                         SEQUENCE {
                    ul-LWA-DRB-ViaWLAN-r14    BOOLEAN,
                    ul-LWA-DataSplitThreshold-r14     ENUMERATED {
                                              b0, b100, b200, b400, b800, b1600, b3200, b6400,
                                              b12800, b25600, b51200, b102400, b204800, b409600,
                                              b819200 }                   OPTIONAL          -- Need OR
                }
            }                                                             OPTIONAL,         -- Need ON
            uplinkOnlyHeaderCompression-r14   CHOICE {
                notUsed-r14                   NULL,
                rohc-r14                      SEQUENCE {
                    maxCID-r14                INTEGER (1..16383)          DEFAULT 15,
                    profiles-r14              SEQUENCE {
                        profile0x0006-r14     BOOLEAN
                    },
                    ...
                }
            }                                 OPTIONAL -- Need ON
``` |

| PDCP-Config information element |
| --- |

```
    ]],
    [[ uplinkDataCompression-r15       SEQUENCE {
           bufferSize-r15                  ENUMERATED {kbyte2, kbyte4, kbyte8, spare1},
           dictionary-r15                  ENUMERATED {sip-SDP, operator} OPTIONAL, -- Need OR
           ...
       }                                                                OPTIONAL,-- Cond Rlc-AM2
       pdcp-DuplicationConfig-r15       CHOICE {
           release                           NULL,
           setup                             SEQUENCE {
               pdcp-Duplication-r15              ENUMERATED {configured, activated}
           }
       }                                                                OPTIONAL -- Need ON
    ]]
}
-- ASN1STOP
```

In LTE, sidelink parameters for header compression and decompression are pre-configured (as discussed in 3GPP TS 36.331) as follows:

```
SL-PreconfigGeneral-r12 ::=   SEQUENCE {
 -- PDCP configuration
    rohc-Profiles-r12             SEQUENCE {
        profile0x0001-r12             BOOLEAN,
        profile0x0002-r12             BOOLEAN,
        profile0x0004-r12             BOOLEAN,
        profile0x0006-r12             BOOLEAN,
        profile0x0101-r12             BOOLEAN,
        profile0x0102-r12             BOOLEAN,
        profile0x0104-r12             BOOLEAN
    },
```

In LTE, sidelink parameters for header compression and decompression are pre-configured (as discussed in 3GPP TS 36.331). According to 3GPP TR 38.885, a UE in RRC_Connected may send a Request for Sidelink Radio Bearer (SLRB) configuration to gNB for a PC5 QoS (Quality of Service) flow used for unicast, broadcast, or groupcast communication in New RAT/Radio (NR) Vehicle-to-Everything (V2X). In response, gNB may provide a UE-specific SLRB configuration to the UE. The SLRB configuration may include a PDCP configuration. Typically, parameters for header compression and decompression will be included in the PDCP configuration.

As specified in 3GPP TS 23.287, both IP based and non-IP based V2X messages are supported over PC5 reference point in NR V2X. In case of IP based V2X messages, header compression and decompression may be applied. Since the SLRB configuration procedure specified in 3GPP TR38.885 does not include any information indicating whether IP based and non-IP based V2X messages will be transmitted on the concerned SLRB, gNB cannot determine whether header compression and decompression should be applied or not.

To solve the above issue, the UE may send information indicating IP based or non-IP based V2X messages will be transmitted on a PC5 QoS flow or on a SLRB to be configured for the PC5 QoS flow when it sends a Request for SLRB configuration to gNB for the PC5 QoS flow so that gNB can determine whether header compression and decompression should be applied to the SLRB.

Alternatively, the UE may send information indicating IP based or non-IP based V2X messages will be transmitted for a V2X service or application (or a Layer-2 destination associated with the V2X service or application) when it sends a message (e.g. SidelinkUEInformation) to inform gNB that it is interested in V2X sidelink communication. This alternative is feasible because IP based and non-IP based V2X messages will not be transmitted via the same unicast link according to 3GPP TS 23.287 (i.e. all V2X messages of the same V2X service or application are either IP based or non-IP based). Since traffic of a V2X service or application is transmitted with a Layer-2 destination, the Layer-2 destination associated with the V2X service or application may be used to identify the V2X service or application in the UE. With the information sent from the UE, the gNB can then determine whether header compression and decompression should be applied or not for the PC5 QoS flow or the SLRB. By this way, gNB may indicate whether header compression and decompression should be applied for a SLRB in a PDCP configuration included a SLRB configuration used to configure the SLRB for the UE. It is noted that a V2X service may be offered by a V2X.

Besides, according to 3GPP TS 36.323, each profile for header compression and decompression (ROHC (Robust Header Compression) profile) could be specific to the particular network layer, transport layer or upper layer protocol combination (e.g. TCP/IP and RTP/UDP/IP). Given that header compression and decompression may need to be applied for a SLRB, gNB may need to further determine which ROHC profile(s) should be configured for the SLRB. Therefore, the UE may need to transmit information indicating network layer, transport layer or upper layer protocol combination (e.g. TCP/IP and RTP/UDP/IP) used on top of a SLRB when it sends a Request for SLRB configuration to gNB for a PC5 QoS flow. Alternatively, the UE may send information indicating network layer, transport layer or upper layer protocol combination used to support a V2X service or application (or a Layer-2 destination associated with the V2X service or application) when it sends a message (e.g. SidelinkUEInformation) to inform gNB that it is interested in V2X sidelink communication. With the information sent from the UE, the gNB can determine the allowed ROHC profile(s) to be applied or configured for the SLRB. By this way, the gNB indicates the allowed ROHC profile(s) for a SLRB in a PDCP configuration included in a SLRB configuration used to configure the SLRB for the UE.

The applicable ROHC profiles may also depend on UE capability i.e. only ROHC profiles supported by the UE can be configured to the UE. In case of unicast, UE capabilities of both UEs engaging in the unicast should be considered. Since both UEs may exchange UE capability with each other via, for example, PC5-RRC messages, one UE (e.g. TX UE)

may transmit UE capabilities of both UEs about supported ROHC profiles to gNB. It is more signaling efficient for the UE to transmit those profiles commonly supported by both UEs to gNB.

The aforementioned solutions are based on the assumption that a whole PDCP configuration for a SLRB is configured by gNB. It is also feasible for a UE to determine whether header compression and decompression should be applied for a SLRB according to whether IP based or non-IP based V2X messages will be transmitted on a PC5 QoS flow or on a SLRB to be configured for the PC5 QoS flow. Besides, the UE may determine the ROHC profiles to apply for a SLRB according to those profiles commonly supported by both UEs engaging in a unicast, while part of PDCP parameters (e.g. discardTimer, pdcp-SN-Size, and/or t-Reordering, etc.) are obtained from gNB. Both UEs may determine those commonly supported ROHC profiles by exchanging UE capability with each other e.g. via PC5-RRC messages.

In case of groupcast or broadcast, there is no direct sidelink established between UEs. As a result, a TX UE cannot forward SLRB configuration or PDCP configuration to RX UEs. One potential solution is for a network node (e.g. V2X Control Function) to provide the applicable ROHC profiles to both TX UE and RX UE during V2X service authorization. In other words, the network node (e.g. V2X Control Function) provides the ROHC profiles applicable to a V2X service to a UE when the UE request service authorization for a V2X service. This solution may also be applied to unicast.

Figure 11:
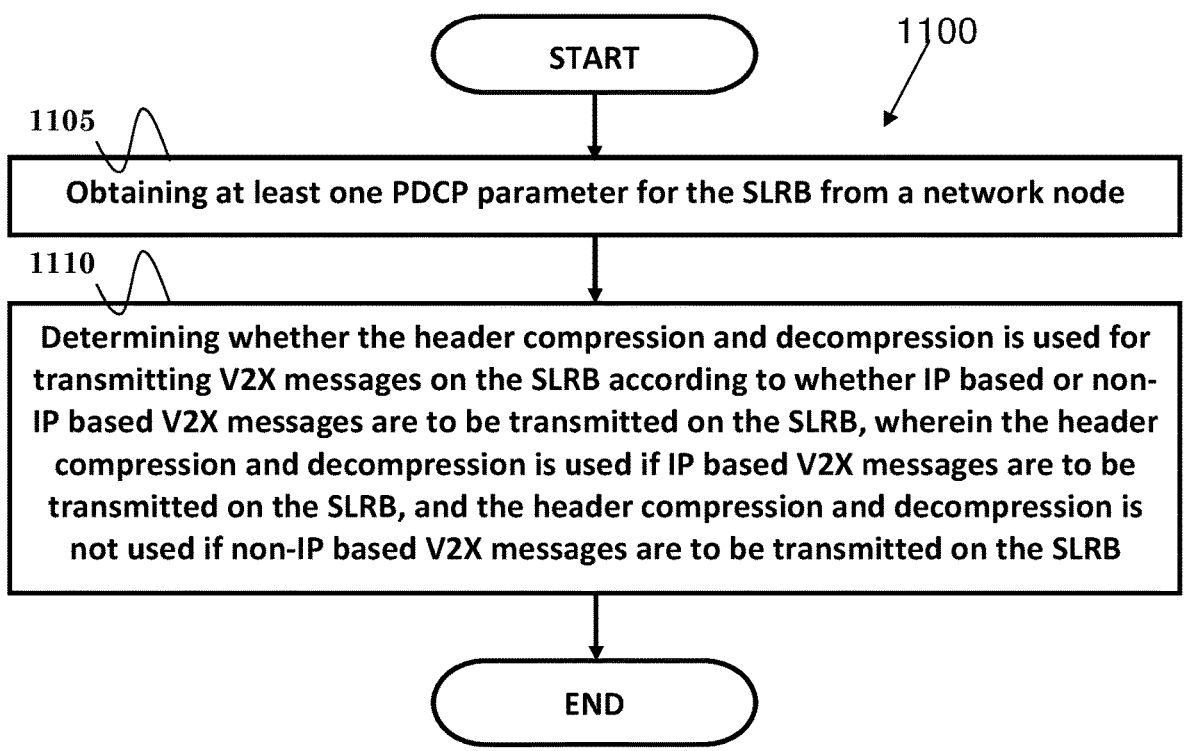
FIG. 11 is a flow chart according to one exemplary embodiment.

FIG. 11 is a flow chart 1100 according to one exemplary embodiment from the perspective of a UE for applying header compression and decompression on a SLRB. In step 1105, the UE obtains at least one PDCP parameter for the SLRB from a network node. In step 1110, the UE determines whether the header compression and decompression is used for transmitting V2X messages on the SLRB according to whether IP based or non-IP based V2X messages are to be transmitted on the SLRB, wherein the header compression and decompression is used if IP based V2X messages are to be transmitted on the SLRB, and the header compression and decompression is not used if non-IP based V2X messages are to be transmitted on the SLRB.

In one embodiment, the at least one PDCP parameter may include a discardTimer, a PDCP-SN-Size, and/or a t-Reordering. However, the at least one PDCP parameter may not include any parameter used for determining whether header compression and decompression is used for transmitting V2X messages on the SLRB.

In one embodiment, the UE could be in RRC_CONNECTED. The UE could transmit a request for a SLRB configuration for establishing the SLRB to the network node. The UE could also receive the SLRB configuration from the network node.

In one embodiment, the SLRB configuration may include a PDCP configuration for the SLRB. The PDCP configuration may include the at least one PDCP parameter. The request for the SLRB configuration could be transmitted to the network node via a SidelinkUEInformation message. The network node could be a base station (e.g. gNB).

Referring back to FIGS. 3 and 4, in one exemplary embodiment of a UE. The first UE 300 includes a program code 312 stored in the memory 310. The CPU 308 could execute program code 312 to enable the UE (i) to obtain at least one PDCP parameter for a SLRB from a network node, and (ii) to determine whether the header compression and decompression is used for transmitting V2X messages on the SLRB according to whether IP based or non-IP based V2X messages are to be transmitted on the SLRB, wherein the header compression and decompression is used if IP based V2X messages are to be transmitted on the SLRB, and the header compression and decompression is not used if non-IP based V2X messages are to be transmitted on the SLRB. Furthermore, the CPU 308 can execute the program code 312 to perform all of the above-described actions and steps or others described herein.

Figure 12:
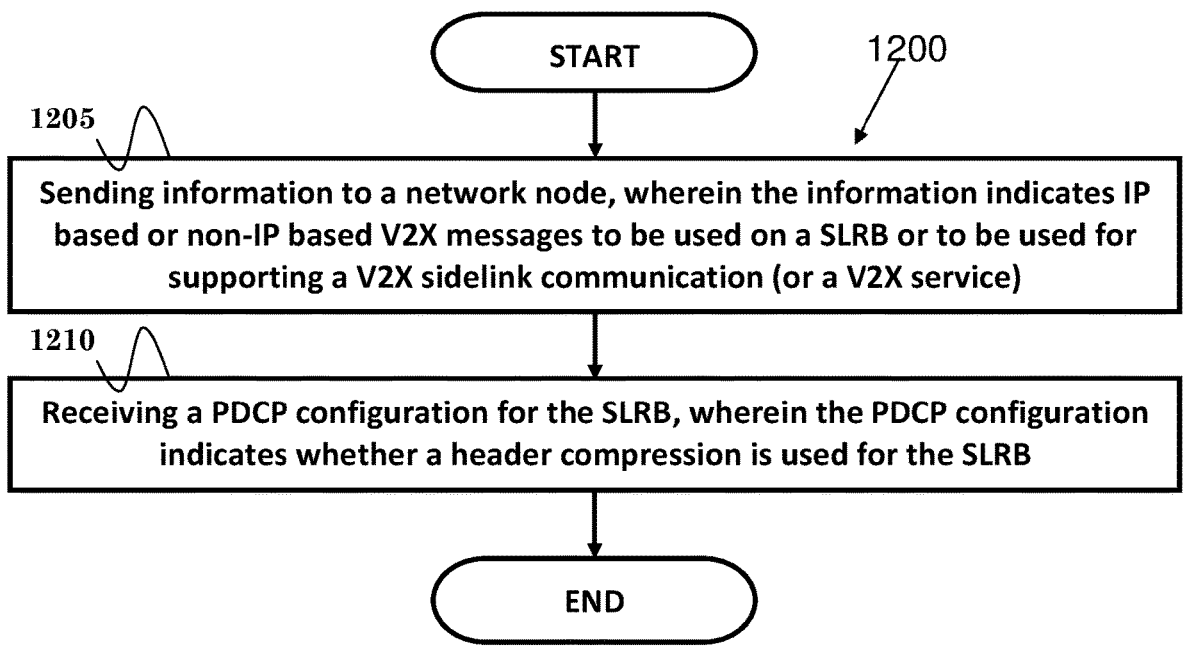
FIG. 12 is a flow chart according to one exemplary embodiment.

FIG. 12 is a flow chart 1200 according to one exemplary embodiment from the perspective of a UE for indicating information for header compression configuration. In step 1205, the UE sends information to a network node, wherein the information indicates IP based or non-IP based V2X messages to be used on a SLRB or to be used for supporting a V2X sidelink communication (or a V2X service). In step 1210, the UE receives a PDCP configuration for the SLRB, wherein the PDCP configuration indicates whether a header compression is used for the SLRB.

In one embodiment, the information could be included in a first RRC message used to request a SLRB configuration for a PC5 QoS flow. The information could also be included in a second RRC message used to inform the network node that the UE is interested in the V2X sidelink communication (or the V2X service), wherein the second RRC message includes a Layer-2 destination associated with the V2X sidelink communication (or the V2X service).

In one embodiment, the SLRB could be used for traffic transfer during the V2X sidelink communication, wherein the V2X sidelink communication supports the V2X service. The V2X sidelink communication could be a unicast, broadcast, or groupcast communication.

In one embodiment, the first RRC message could be a SidelinkUEInformation message. The second RRC message could be a UEAssistanceInformation.

Referring back to FIGS. 3 and 4, in one exemplary embodiment of a UE. The first UE 300 includes a program code 312 stored in the memory 310. The CPU 308 could execute program code 312 to enable the UE (i) to send information to a network node, wherein the information indicates IP based or non-IP based V2X messages to be used on a SLRB or to be used for supporting a V2X sidelink communication (or a V2X service), and (ii) to receive a PDCP configuration for the SLRB, wherein the PDCP configuration indicates whether a header compression is used for the SLRB. Furthermore, the CPU 308 can execute the program code 312 to perform all of the above-described actions and steps or others described herein.

Figure 13:
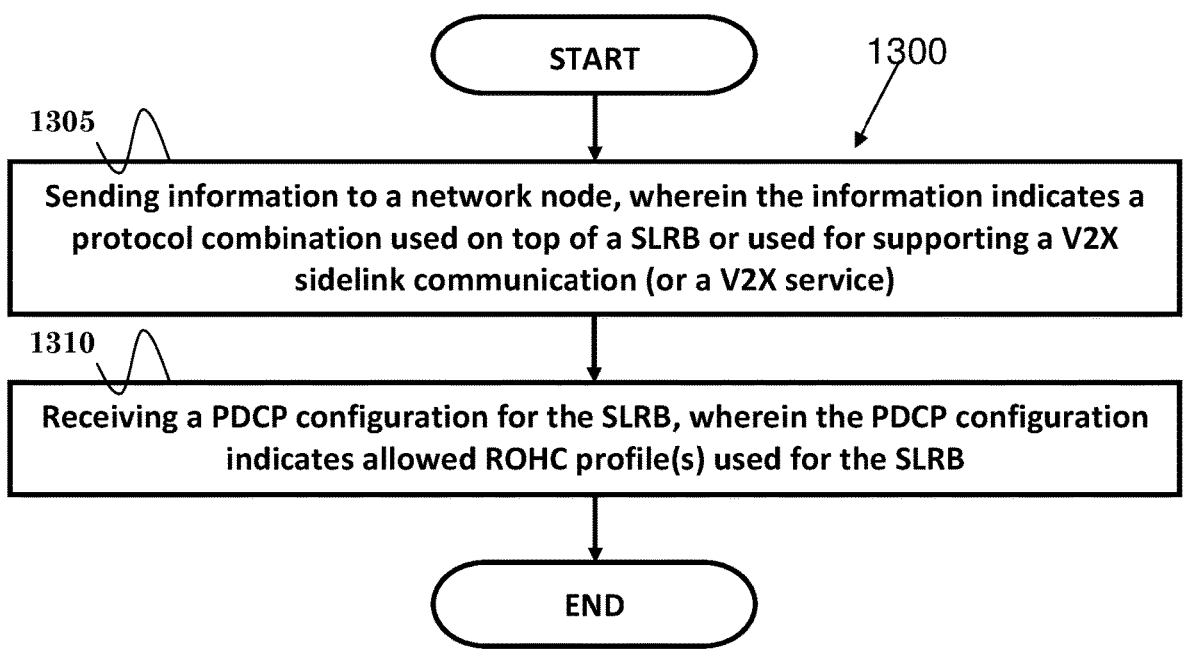
FIG. 13 is a flow chart according to one exemplary embodiment.

FIG. 13 is a flow chart 1300 according to one exemplary embodiment from the perspective of a UE for indicating information for header compression configuration. In step 1305, the UE sends information to a network node, wherein the information indicates a protocol combination used on top of a SLRB or used for supporting a V2X sidelink communication (or a V2X service). In step 1310, the UE receives a PDCP configuration for the SLRB, wherein the PDCP configuration indicates allowed ROHC profile(s) used for the SLRB.

In one embodiment, the protocol combination may mean network layer, transport layer or upper layer protocol combination. The information may be included in a first RRC message used to request a SLRB configuration for a PC5 QoS flow. The information may also be included in a second RRC message used to inform the network node that the UE is interested in the V2X sidelink communication (or the V2X service), wherein the second RRC message includes a Layer-2 destination associated with the V2X sidelink communication (or the V2X service).

In one embodiment, the SLRB may be used for traffic transfer during the V2X sidelink communication, wherein the V2X sidelink communication supports the V2X service. The V2X sidelink communication could be a unicast, broadcast, or groupcast communication.

In one embodiment, the first RRC message may be a SidelinkUEInformation message. The second RRC message may be a UEAssistanceInformation.

Referring back to FIGS. 3 and 4, in one exemplary embodiment of a UE. The UE 300 includes a program code 312 stored in the memory 310. The CPU 308 could execute program code 312 to enable the UE (i) to send information to a network node, wherein the information indicates a protocol combination used on top of a SLRB or used for supporting a V2X sidelink communication (or a V2X service), and (ii) to receive a PDCP configuration for the SLRB, wherein the PDCP configuration indicates allowed ROHC profile(s) used for the SLRB. Furthermore, the CPU 308 can execute the program code 312 to perform all of the above-described actions and steps or others described herein.

Figure 14:
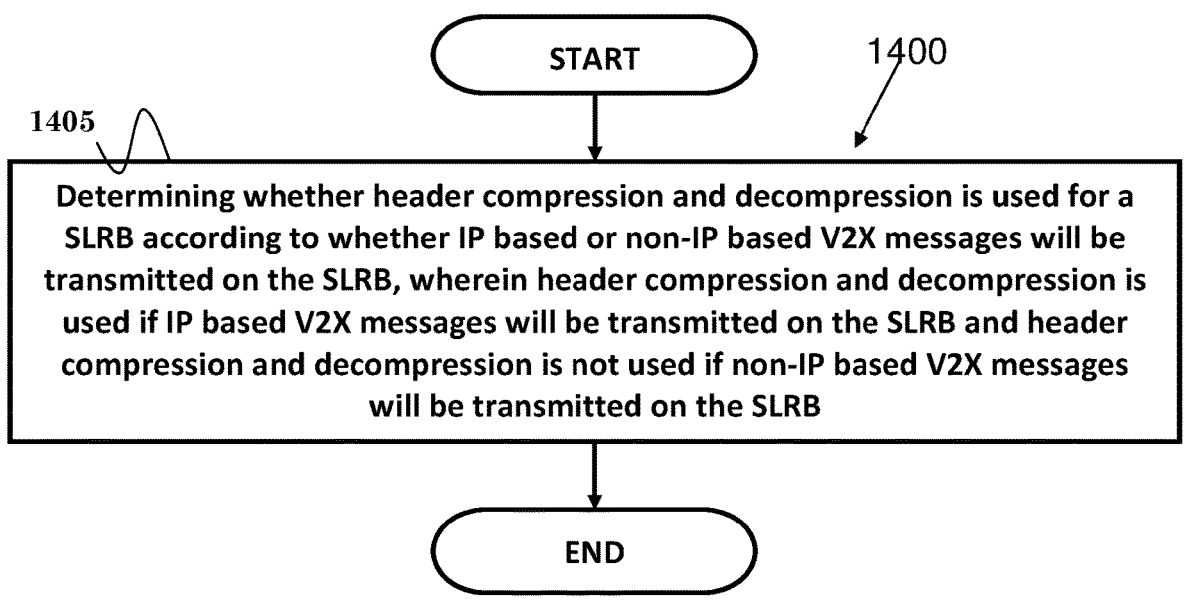
FIG. 14 is a flow chart according to one exemplary embodiment.

FIG. 14 is a flow chart 1400 according to one exemplary embodiment from the perspective of a UE for determining a header compression configuration for a SLRB. In step 1405, the UE determines whether header compression and decompression is used for a SLRB according to whether IP based or non-IP based V2X messages will be transmitted on the SLRB, wherein header compression and decompression is used if IP based V2X messages will be transmitted on the SLRB and header compression and decompression is not used if non-IP based V2X messages will be transmitted on the SLRB.

Referring back to FIGS. 3 and 4, in one exemplary embodiment of a UE. The UE 300 includes a program code 312 stored in the memory 310. The CPU 308 could execute program code 312 to enable the UE to determine whether header compression and decompression is used for a SLRB according to whether IP based or non-IP based V2X messages will be transmitted on the SLRB, wherein header compression and decompression is used if IP based V2X messages will be transmitted on the SLRB and header compression and decompression is not used if non-IP based V2X messages will be transmitted on the SLRB. Furthermore, the CPU 308 can execute the program code 312 to perform all of the above-described actions and steps or others described herein.

Figure 15:
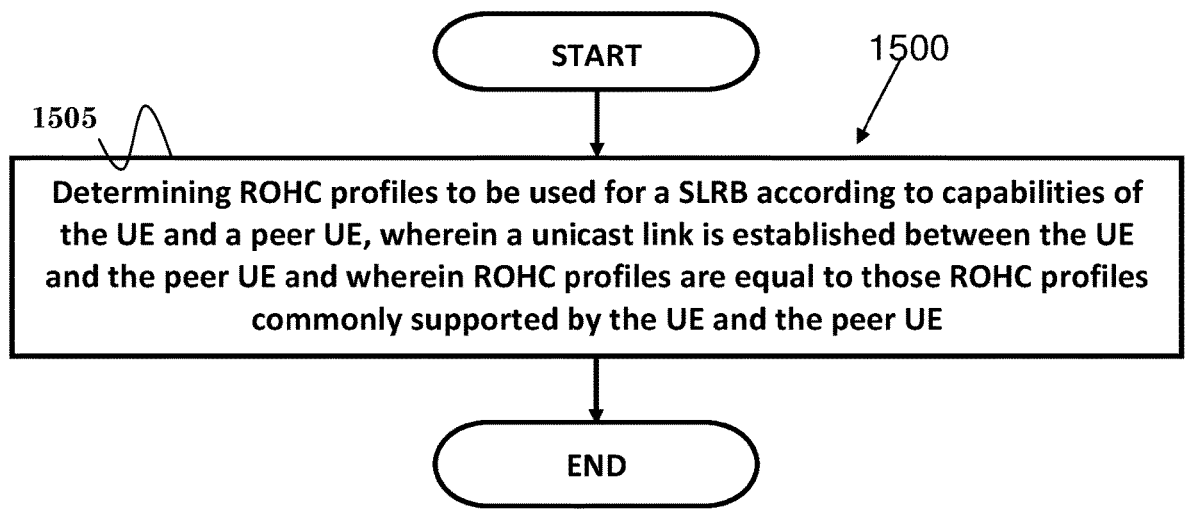
FIG. 15 is a flow chart according to one exemplary embodiment.

FIG. 15 is a flow chart 1500 according to one exemplary embodiment from the perspective of a UE for determining a header compression configuration for a SLRB. In step 1505, the UE determines ROHC profiles to be used for a SLRB according to capabilities of the UE and a peer UE, wherein a unicast link is established between the UE and the peer UE and wherein ROHC profiles are equal to those ROHC profiles commonly supported by the UE and the peer UE.

In one embodiment, the UE may obtain part of the PDCP parameters from a network node (e.g. gNB). The part of PDCP parameters may include at least discardTimer, pdcp-SN-Size, and/or t-Reordering.

In one embodiment, the UE may determine commonly supported ROHC profiles according to ROHC profiles supported by the UE and ROHC profiles supported by the peer UE. Furthermore, the UE may obtain ROHC profiles supported by the peer UE according to UE capability received from the peer UE (e.g. via a PC5-RRC message).

Referring back to FIGS. 3 and 4, in one exemplary embodiment of a UE. The UE 300 includes a program code 312 stored in the memory 310. The CPU 308 could execute program code 312 to enable the UE to determine ROHC profiles to be used for a SLRB according to capabilities of the UE and a peer UE, wherein a unicast link is established between the UE and the peer UE and wherein ROHC profiles are equal to those ROHC profiles commonly supported by the UE and the peer UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE) to apply header compression and decompression on a Sidelink Radio Bearer (SLRB), comprising:

transmitting a request to a network node for a SLRB configuration for establishing the SLRB used for V2X sidelink communication with other UE(s);

receiving the SLRB configuration from the network node, wherein the SLRB configuration includes a Packet Data Convergence Protocol (PDCP) configuration for the SLRB and wherein the PDCP configuration includes at least one PDCP parameter for the SLRB and includes no parameter used for determining whether header compression and decompression is used for transmitting V2X messages on the SLRB; and determining whether the header compression and decompression is used for transmitting (Vehicle-to-Everything) V2X messages on the SLRB according to whether (Internet Protocol) IP based or non-IP based V2X messages are to be transmitted on the SLRB, wherein the header compression and decompression is used if IP based V2X messages are to be transmitted on the SLRB, and the header compression and decompression is not used if non-IP based V2X messages are to be transmitted on the SLRB.

2. The method of claim 1, wherein the at least one PDCP parameter includes a discardTimer, a PDCP-SN-Size, and/or a t-Reordering.

3. The method of claim 1, wherein the UE is in RRC_CONNECTED.

4. The method of claim 1, wherein the request for the SLRB configuration is transmitted to the network node via a SidelinkUEInformation message.

5. The method of claim 1, wherein the network node is a base station.

6. A UE (User Equipment), comprising:

a control circuit;

a processor installed in the control circuit; and a memory installed in the control circuit and operatively coupled to the processor;

wherein the processor is configured to execute a program code stored in the memory to:

transmit a request to a network node for a SLRB configuration for establishing the SLRB used for V2X sidelink communication with other UE(s);

receive the SLRB configuration from the network node, wherein the SLRB configuration includes a Packet Data Convergence Protocol (PDCP) configuration for the SLRB and wherein the PDCP configuration includes at least one PDCP parameter for the SLRB and includes no parameter used for determining whether header compression and decompression is used for transmitting V2X messages on the SLRB; and determine whether the header compression and decompression is used for transmitting Vehicle-to-Everything (V2X) messages on a SLRB according to whether (Internet Protocol) IP based or non-IP based V2X messages are to be transmitted on the SLRB, wherein the header compression and decompression is used if IP based V2X messages are to be transmitted on the SLRB and the header compression and decompression is not used if non-IP based V2X messages are to be transmitted on the SLRB.

7. The UE of claim 6, wherein the at least one PDCP parameter includes a discardTimer, a PDCP-SN-Size, and/or a t-Reordering.

8. The UE of claim 6, wherein the UE is in RRC_CONNECTED.

9. The UE of claim 6, wherein the request for the SLRB configuration is transmitted to the network node via a SidelinkUEInformation message.

10. The UE of claim 6, wherein the network node is a base station.

* * * * *

UNITED STATES PATENT AND TRADEMARK OFFICE
CERTIFICATE OF CORRECTION

PATENT NO. : 10,951,745 B1
APPLICATION NO. : 16/993644
DATED : March 16, 2021
INVENTOR(S) : Li-Te Pan et al.

Page 1 of 1

It is certified that error appears in the above-identified patent and that said Letters Patent is hereby corrected as shown below:

On the Title Page

In Column 1, Line 60, under Related U.S. Application Data, please replace "62/890,582" with -- 62/890,852 --.

Signed and Sealed this
Eighth Day of August, 2023

Katherine Kelly Vidal
*Director of the United States Patent and Trademark Office*